(12) United States Patent
Kuroda (10) Patent No.: US 11,036,444 B2
(45) Date of Patent: Jun. 15, 2021

(54) IMAGE FORMING APPARATUS AND CONTROL METHOD FOR IMAGE FORMING APPARATUS

(71) Applicant: KYOCERA Document Solutions Inc., Osaka (JP)

(72) Inventor: Koji Kuroda, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 16/798,899

(22) Filed: Feb. 24, 2020

(65) Prior Publication Data

US 2020/0272375 A1 Aug. 27, 2020

(30) Foreign Application Priority Data

Feb. 27, 2019 (JP) .............................. JP2019-033967

(51) Int. Cl.
    *G06F 3/12* (2006.01)
(52) U.S. Cl.
    CPC .......... *G06F 3/1208* (2013.01); *G06F 3/1267* (2013.01); *G06F 3/1274* (2013.01)

(58) Field of Classification Search
    CPC .... G06F 3/1208; G06F 3/1267; G06F 3/1274; G06F 3/1256; G06F 3/1285; G06F 3/1273
    See application file for complete search history.

(56) References Cited

U.S. PATENT DOCUMENTS

| 10,042,592 | B1* | 8/2018 | Soriano | ................... G06F 3/126 |
| 2009/0027722 | A1* | 1/2009 | Tsujimoto | ............ G06F 3/1285 |
| | | | | 358/1.15 |
| 2014/0126015 | A1* | 5/2014 | Kaneko | ............... G06K 15/408 |
| | | | | 358/1.15 |
| 2018/0048772 | A1* | 2/2018 | Sakatani | .................. H04N 1/38 |

FOREIGN PATENT DOCUMENTS

JP    H 05-177909 A    7/1993

\* cited by examiner

*Primary Examiner* — Iriana Cruz
(74) *Attorney, Agent, or Firm* — Stein IP, LLC (57) ABSTRACT

In the image forming apparatus, a storage medium stores print data (check data) of a received print job that has been completed. When a communication circuit receives print data, a controller, by using the check data, decides whether or not a received print job which is going to be executed based on the received print data is a reprint job for redoing printing. Upon deciding as the reprint job, the controller instructs the operation panel to display difference part of print contents.

14 Claims, 6 Drawing Sheets

IMAGE FORMING APPARATUS AND CONTROL METHOD FOR IMAGE FORMING APPARATUS

INCORPORATION BY REFERENCE

This application is based upon and claims the benefit of priority from the corresponding Japanese Patent Application No. 2019-033967 filed on Feb. 27, 2019, the entire contents of which are incorporated herein by reference.

BACKGROUND

The present disclosure relates to an Image forming apparatus which executes printing based on received print data.

Printing may be carried out on an erroneous setting. Printing may also be carried out while part that should be corrected remain uncorrected. Wasteful printings are done. Paper sheets and color materials are consumed uselessly. Thus, there have been developed image forming apparatuses that issue an alarm (a message) when problematic printing is likely to be executed.

There has been known an example of image forming apparatuses that issue an alarm as shown below. Specifically, there is described a printer which checks whether or not print data fed from an upper-level device overflows a sheet of paper and, if any, displays the overflowing from the sheet to an operator. With such an arrangement, when printing-intentioned data erroneously overflows the sheet, the image forming apparatus displays an alarm message so that the user is enabled to stop the printing operation.

There are provided image forming apparatuses that execute printing based on data received from a computer. In this case, the image forming apparatus is used as a printer. For example, the user instructs the image forming apparatus to print materials or documents prepared by using a computer.

When checking a printed matter made by the image forming apparatus, a print-job worker may awake to insufficient points. For example, the worker may awake to such errors as non-containment within one page (overflowing or stretching to another page), misdescriptions (writing errors), or non-printing of necessary part. In such a case, the worker corrects those errors. After correction, the worker executes printing one more time.

There is a problem that correction and reprinting may be executed not a few times (repeated). For example, in cases of insufficient confirmation or erroneous countermeasures, correction and reprinting are repeated. The worker comes and goes over and over again between the computer and the image forming apparatus. There may result lots of waste of paper sheets, color materials, time and electric power.

In the above-described prior art, an alarm about overflowing is issued. However, the print-job worker is not informed of an extent to which the overflowing reaches. The worker is uncertain as to proper countermeasure and necessitated to undergo trial and error for elimination of the overflowing. As a result, correction and reprinting may be repeated.

This problem remains insoluble with the above-described prior art.

SUMMARY

An image forming apparatus according to the present disclosure includes an operation panel, a communication circuit, a printing unit, a storage medium, and a controller. The operation panel executes display and accepts operations. The communication circuit receives print data. The printing unit executes a received print job which is a print job based on the received print data. The storage medium stores check data which is the print data of the received print job that has been completed. The controller, upon reception of the print data by the communication circuit, decides, by using the check data of the storage medium, whether or not the received print job which is going to be executed based on the received print data is a reprint job for redoing printing. Then, upon deciding as the reprint job, the controller recognizes difference part between print contents that have been printed and print contents of the reprint job. The controller further instructs the operation panel to display the difference part.

Also, an image forming apparatus control method according to the present disclosure includes the steps of: receiving print data; executing a received print job which is a print job based on the received print data; storing check data which is the print data of the received print job that has been completed; upon receiving the print data, deciding, by using the check data, whether or not the received print job which is going to be executed based on the received print data is a reprint job for redoing printing; upon deciding as the reprint job, recognizing difference part between print contents that have been printed and print contents of the reprint job; and displaying the difference part.

Further features and advantages of the present disclosure will become more apparent from the description of an embodiment given below.

DETAILED DESCRIPTION

An image forming apparatus according to the present disclosure makes it possible to confirm differences between previously printed contents and soon-to-be-printed contents (correction part), thereby preventing repetitions of correction and reprinting. Hereinbelow, an embodiment of the disclosure will be described with reference to FIGS. 1 to 8. The following description will be given on a multifunction peripheral 100 as an example of the image forming apparatus. The image forming apparatus is not limited to the multifunction peripheral 100. The image forming apparatus may be an image forming apparatus of other types such as a printer. In addition, such components as configuration, placement and the like of the apparatus described in this embodiment should be construed not as limiting the scope of the disclosure but as being a mere explanation example.

(Multifunction Peripheral 100)

Figure 1:
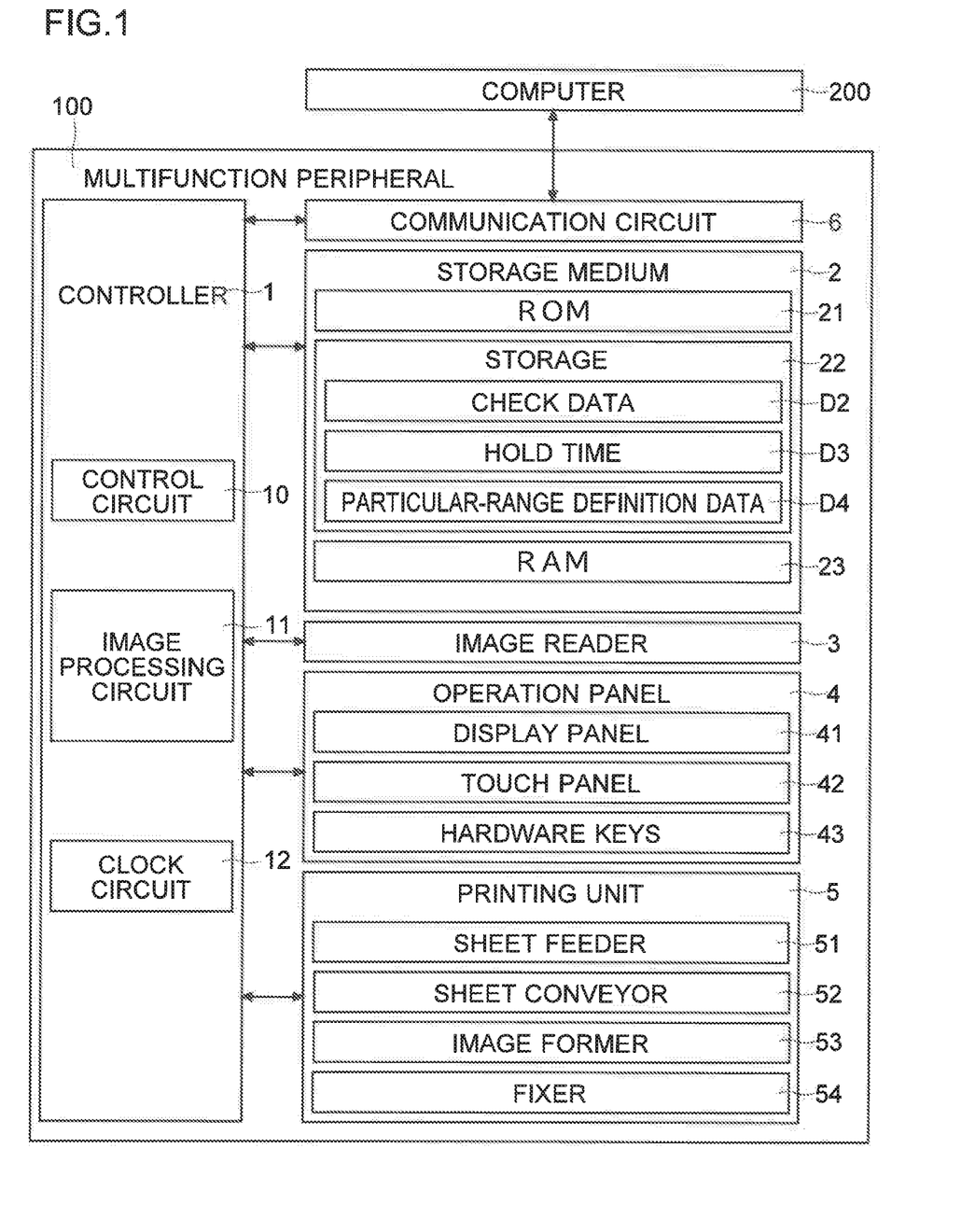
FIG. 1 is a view showing an example of a multifunction peripheral according to an embodiment.

An example of the multifunction peripheral 100 according to the embodiment will be described with reference to FIG. 1. The multifunction peripheral 100 includes a controller 1, a storage medium 2, an image reader 3, an operation panel 4, a printing unit 5, and a communication circuit 6. The controller 1 controls operations of the multifunction peripheral 100. The controller 1 includes a control circuit 10 and an image processing circuit 11. For example, the control circuit 10 is a CPU. Based on programs and data stored in the storage medium 2, the control circuit 10 controls individual units (image reader 3, operation panel 4, printing unit 5, communication circuit 6). The image processing circuit 11 executes various types of image processing. For example, the image processing circuit 11 is a circuit exclusively for image processing (ASIC, i.e., application specific integrated circuit). The image processing circuit 11, for example, analyzes data described in a page description language and executes a rasterizing process. The rasterizing process is a process of generating image data (raster data, bitmap data).

The multifunction peripheral 100 includes ROM 21, a storage 22, and RAM 23 as the storage medium 2. For example, the ROM 21 is flash ROM. The storage 22 is a nonvolatile storage device of large capacity such as HDD or SSD. The storage medium 2 stores various types of data and control programs. The storage medium 2 stores, for example, control data, set data, and image data.

In document reading, the controller 1 instructs the image reader 3 to execute the document reading. The image reader 3 generates document image data. For document reading, the image reader 3 includes a light source (lamp), a lens, and an image sensor (line sensor).

The operation panel 4 includes a display panel 41, a touch panel 42, and hardware keys 43. The display panel 41 displays a screen and images. The controller 1 controls the display of the display panel 41. The controller 1 instructs the display panel 41 to display operation images to be used for job settings. The operation images are buttons and keys as an example. The touch panel 42 accepts an operation of a user. The touch panel 42 is provided on top of the display panel 41. The touch panel 42 recognizes touch positions. Based on an output of the touch panel 42, the controller 1 recognizes an operated operation image. Based on the operated operation image, the controller 1 recognizes an operation content of the user. The hardware keys 43 as well accept an operation of the user.

The printing unit 5 includes a sheet feeder 51, a sheet conveyor 52, an image former 53, and a fixer 54. The sheet feeder 51 includes a sheet feed roller, and a sheet feed motor for rotating the sheet feed roller. In a print job, the controller 1 makes the sheet feed roller and the sheet feed motor rotated to feed out paper sheets one by one to the sheet conveyor 52. The sheet conveyor 52 includes a motor and a conveyance roller pair. The controller 1 makes a sheet, which has been fed out from the sheet feeder 51, conveyed to the sheet conveyor 52. The image former 53 includes a photosensitive drum, a charging device, an exposure device, a developing device, and a transfer roller. The controller 1 makes the photosensitive drum electrically charged and further exposed to light based on image data. The controller 1 makes an electrostatic latent image of the photosensitive drum developed with toner. Also, the controller 1 makes a toner image transferred onto the sheet. The fixer 54 includes a fixing heater and a fixing roller. The controller 1 instructs the fixer 54 to heat and pressurize the sheet to which the toner image has been transferred. The controller 1 instructs the fixer 54 to execute fixation of the toner image.

The communication circuit 6 communicates with a computer 200. The communication circuit 6 includes a connector, a communication control circuit, and communication memory. The communication memory stores communication software. The communication circuit 6 receives print data D1 from the computer 200 (see FIG. 2). Based on the received print data D1, the controller 1 instructs the printing unit 5 to execute printing (print job).

(Computer 200 and Print Data D1)

Figure 2:
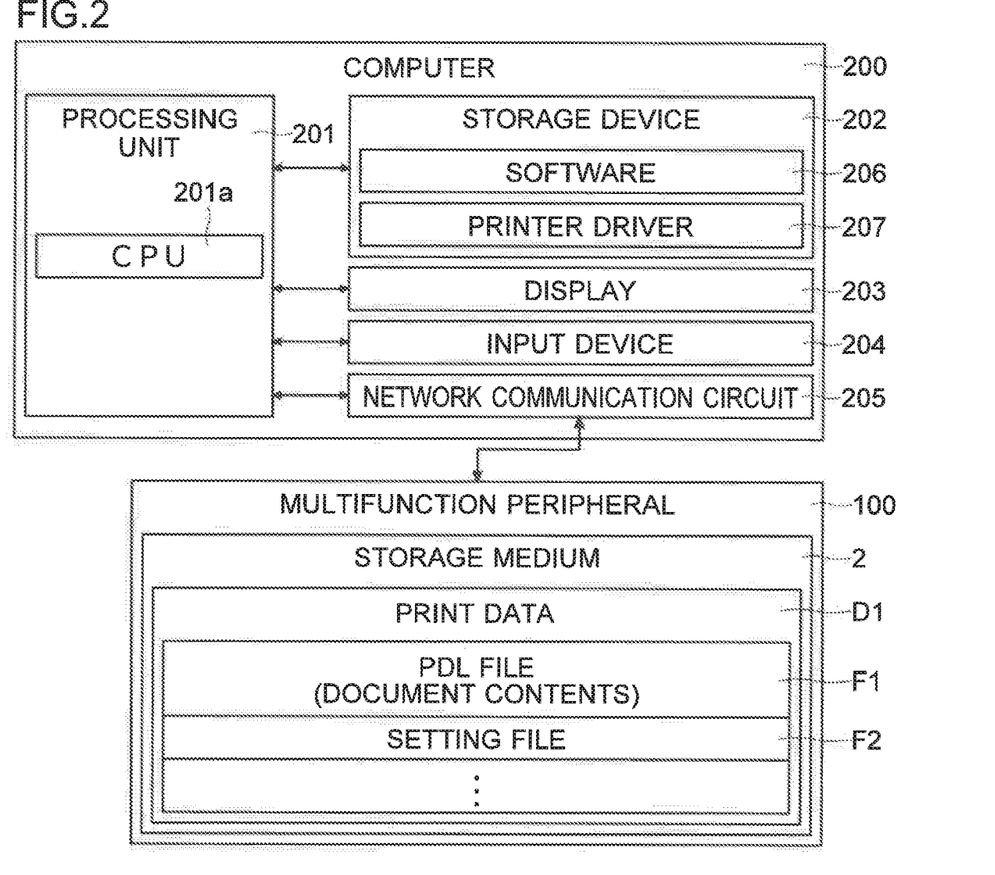
FIG. 2 is a view showing an example of a computer according to the embodiment.

Next, an example of the computer 200 according to this embodiment will be described with reference to FIG. 2. The computer 200 is communicatable with the communication circuit 6. For example, the computer 200 and the communication circuit 6 communicate with each other via a network. A plurality of the computers 200 may be provided communicatable with the communication circuit 6. For convenience' sake, only one computer 200 is shown in FIG. 2. A combination of the multifunction peripheral 100 and the computer 200 can be regarded as an image forming system.

For example, the computer 200 is a PC or a server. In addition, the computer 200 needs only to be one capable of preparing print data D1 and transmitting the print data D1 to the multifunction peripheral 100. For example, the computer 200 may be a smartphone or a tablet type terminal. The computer 200 includes a processing unit 201, a storage device 202, a display 203, an input device 204, and a network communication circuit 205.

The processing unit 201 controls operations of the computer 200. For example, the processing unit 201 is a printed circuit board containing a CPU 201a. Based on an OS, software 206 and data, the processing unit 201 controls operations of the computer 200. The storage device 202 includes ROM, RAM, and an HDD. The storage device 202 stores the OS of the computer 200, programs, the software 206, and data. The processing unit 201 controls individual units of the computer 200 according to storage contents of the storage device 202.

The processing unit 201 instructs the display 203 to display various types of information. The input device 204 accepts operations of the user. The input device 204 is connected to the processing unit 201. For example, the input device 204 is a keyboard or a mouse. The network communication circuit 205 includes a communication circuit, and communication software 206. In response to an instruction of the processing unit 201, the network communication circuit 205 communicates with the communication circuit 6 of the multifunction peripheral 100. For printing, the network communication circuit 205 transmits the print data D1 toward the communication circuit 6 of the multifunction peripheral 100. The communication circuit 6 receives the print data D1.

The software 206 is installed on the storage device 202 of the computer 200. For example, word processor software, spreadsheet software, image data editing software, and browser software are installed. Also, a printer driver 207 is installed on the storage device 202 of the computer 200. The printer driver 207 is software for executing printing by using the multifunction peripheral 100.

The computer 200 is enabled to prepare and edit files by using the input device 204 and the software 206. With the intention of printing a file (document) by using the software 206, the user enters a print command of the software 206. The input device 204 accepts an input of the print command. Upon input of the print command, the processing unit 201 generates print data D1 based on the printer driver 207. The processing unit 201 instructs the network communication circuit 205 to transmit the generated print data D1 toward the communication circuit 6 of the multifunction peripheral 100. The print data D1 received by the communication circuit 6 is stored in the storage medium 2.

An example of the print data D1 is shown in FIG. 2. The print data D1 includes one or more files. For example, the print data D1 includes a PDL file F1 and a setting file F2. Based on the printer driver 207, the processing unit 201 generates a PDL file F1 in which contents of individual pages of a document (print contents) are described in the page description language. The printer driver 207 includes software for converting page contents (print contents) Into data described in the page description language. Also, the processing unit 201 makes the setting file F2 contained in the print data D1, where the setting file F2 includes set values which are set by the user.

The PDL file F1 may include file names of files for which the print command has been executed (print-source files). The PDL file F1 also includes characters (text, words, sentences) to be printed. In the PDL file F1, types of in-page position, size, font and decoration are defined for every single character.

(Flow of Printing Based on Print Data D1)

Figure 3:
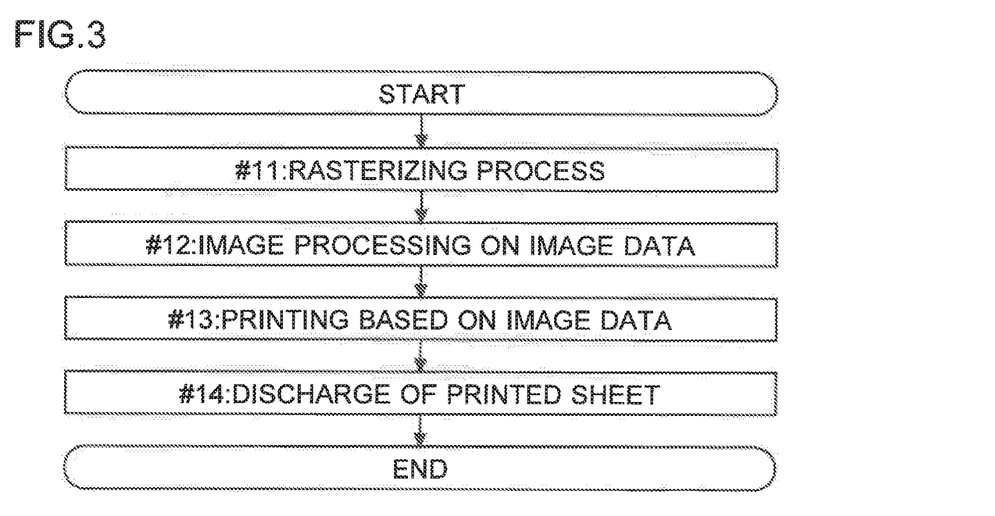
FIG. 3 is a view showing an example of a flow of printing based on print data according to the embodiment.

Next, an example of a flow of printing based on the print data D1 according to the embodiment will be described with reference to FIG. 3. A start in FIG. 3 is a time point at which the controller 1 has decided to start a print job (received print job, printer job) based on the received print data D1. By this decision time point, the communication circuit 6 has completed the reception of print data D1. Also, the storage medium 2 has stored the received print data D1.

Based on the PDL file F1, the controller 1 executes a rasterizing process (step #11). For example, the image processing circuit 11 of the controller 1 executes the rasterizing process. In this case, the image processing circuit 11 includes a rasterizing processing circuit. By the rasterizing process, image data (bitmap data) is generated. The controller 1 generates image data of each page. In a case where the PDL file F1 involves printing plural pages, the controller 1 generates image data of plural pages, respectively.

The PDL file F1 is data in which output images of printing are described in the page description language. For a process of generating image data based on the PDL file F1, the controller 1 analyzes the PDL file F1. The controller 1 analyzes description of the PDL file F1. Described in the PDL file F1 are: contents of characters, symbols and graphics to be printed; positions of the characters, the symbols and the graphics to be printed; and formats of the characters, the symbols and the graphics to be printed. Based on analysis results (based on the description of the PDL file F1), the controller 1 executes the rasterizing process.

Next, the controller 1 executes image processing on the generated image data (step #12). For example, the image processing circuit 11 executes the image processing. The controller 1 looks up to the setting file F2. Based on the setting file F2, the controller 1 recognizes the image processing to be executed. For example, with a scale-down factor set by the printer driver 207, the scale-down factor is contained in the setting file F2. Based on the setting file F2, the image processing circuit 11 executes a scaling-down process. Further, the image processing circuit 11 converts the form of the image data into a form adapted to toner-image formation in the image former 53.

Based on image data after the conversion, the controller 1 instructs the printing unit 5 to execute printing (step #13). The image processing circuit 11 transmits for-output image data (after-conversion image data) to the printing unit 5 on a line-by-line basis. Based on the received for-output image data, the printing unit 5 generates toner images on a line-by-line basis. The controller 1 makes a sheet fed and conveyed in time for transfer of the toner images. The controller 1 instructs the fixer 54 to execute fixation of the toner images. Then, the controller 1 makes the printed sheet discharged onto a discharge tray (step #14). Thus, printing of one page is completed (end).

(Saving Process of Check Data D2)

Figure 4:
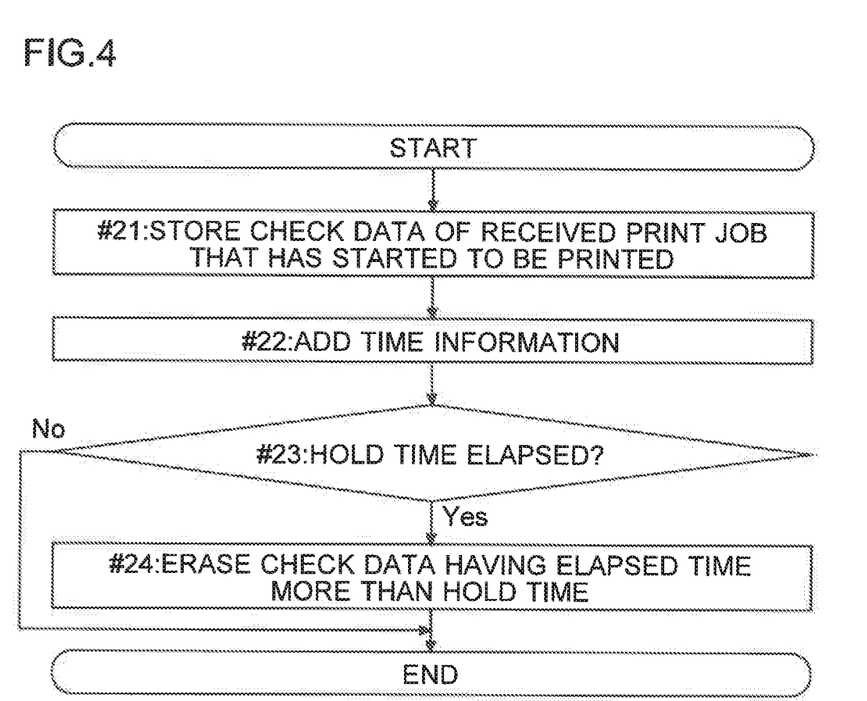
FIG. 4 is a view showing an example of a check data saving process in the multifunction peripheral according to the embodiment.

Next, an example of a check data D2 saving process in the multifunction peripheral 100 according to the embodiment will be described with reference to FIG. 4. A start in FIG. 4 is a time point at which the received print job has been completed. In addition, the start in FIG. 4 may also be a time point at which the received print job has been started or a time point during execution of the received print job.

The controller 1 makes the check data D2 of the received print job, which has started to be printed, stored in nonvolatile fashion in the storage medium 2 (step #21). For example, the controller 1 makes the check data D2 stored in the storage 22 (HDD) (see FIG. 1). The controller 1 makes the print data D1 (PDL file F1 and setting file F2) of the received print job, which has started to be printed, stored in the storage medium 2 as check data D2. Besides, the controller 1 may make for-output image data of the received print job, which has started to be printed, stored in the storage medium 2 also as the check data D2. The check data D2 is data representing print contents of the received print job that has started to be printed.

The controller 1 adds time information to newly stored check data D2 (step #22). The time information is information as to date (year, month and day) and time at which the check data D2 is stored. For recognition of the date (year, month and day) and time, the controller 1 includes a clock circuit 12 (see FIG. 1). The clock circuit 12 is an RTC. The clock circuit 12 holds the current date (year, month and day) and time.

Next, the controller 1 checks whether or not there is a piece of check data D2 whose elapsed time since its storage is longer than a hold time D3 (step #23). More specifically, the controller 1 checks the time information as to each piece of the check data D2 as well as the current date (year, month and day) and time. When there is a piece of check data D2 having an elapsed time more than the hold time D3 (Yes at step #23), the controller 1 instructs the storage medium 2 to erase the piece of check data D2 having an elapsed time more than the hold time D3 (step #24). Pieces of check data D2 which are highly likely to have become unnecessary can be automatically erased. Meanwhile, when there is no check data D2 having an elapsed time more than the hold time D3 (No at step #23), or subsequent to step #24, the controller 1 makes this flowchart terminated (end).

The hold time D3 is determined beforehand. For example, the hold time D3 is defined within a range from several minutes to one hour. Preferably, the hold time D3 is several tens of minutes. The hold time D3 may be determined in consideration of the time which is necessary for the user, who has become aware of a misprint, to fulfill correction and reprinting involved. The storage medium 2 stores the hold time D3 in nonvolatile fashion (see FIG. 1). The operation panel 4 may accept a setting for the hold time D3. A user or an administrator may set a time duration over which the check data D2 is to be erased. In this case, the controller 1 makes a hold time D3, which has been set by the operation panel 4, stored in the storage medium 2. The controller 1 executes step #23 with use of the set hold time D3.

(Display of Difference Part 8)

Next, an example of a display process for difference part 8 in the multifunction peripheral 100 according to the embodiment will be described with reference to FIGS. 5 to 8. When the communication circuit 6 receives print data D1, the controller 1, using check data D2 of the storage medium 2, decides whether or not a print job (received print job) to be executed based on the received print data D1 is a reprint job (a print job of reexecution). When deciding as a reprint job, the controller 1 recognizes difference part 8 between print contents being before reexecution and having been printed and print contents of the reprint job. For confirmation, the controller 1 instructs the operation panel 4 (display panel 41) to display the difference part 8. This allows the user to check whether or not altered portions are correct. This makes it possible to prevent occurrence of misprints. It becomes possible to reduce recurrence of misprints. Hereinbelow, a flow of the display process as to the difference part 8 will be described with reference to FIGS. 5 to 8.

Figure 5:
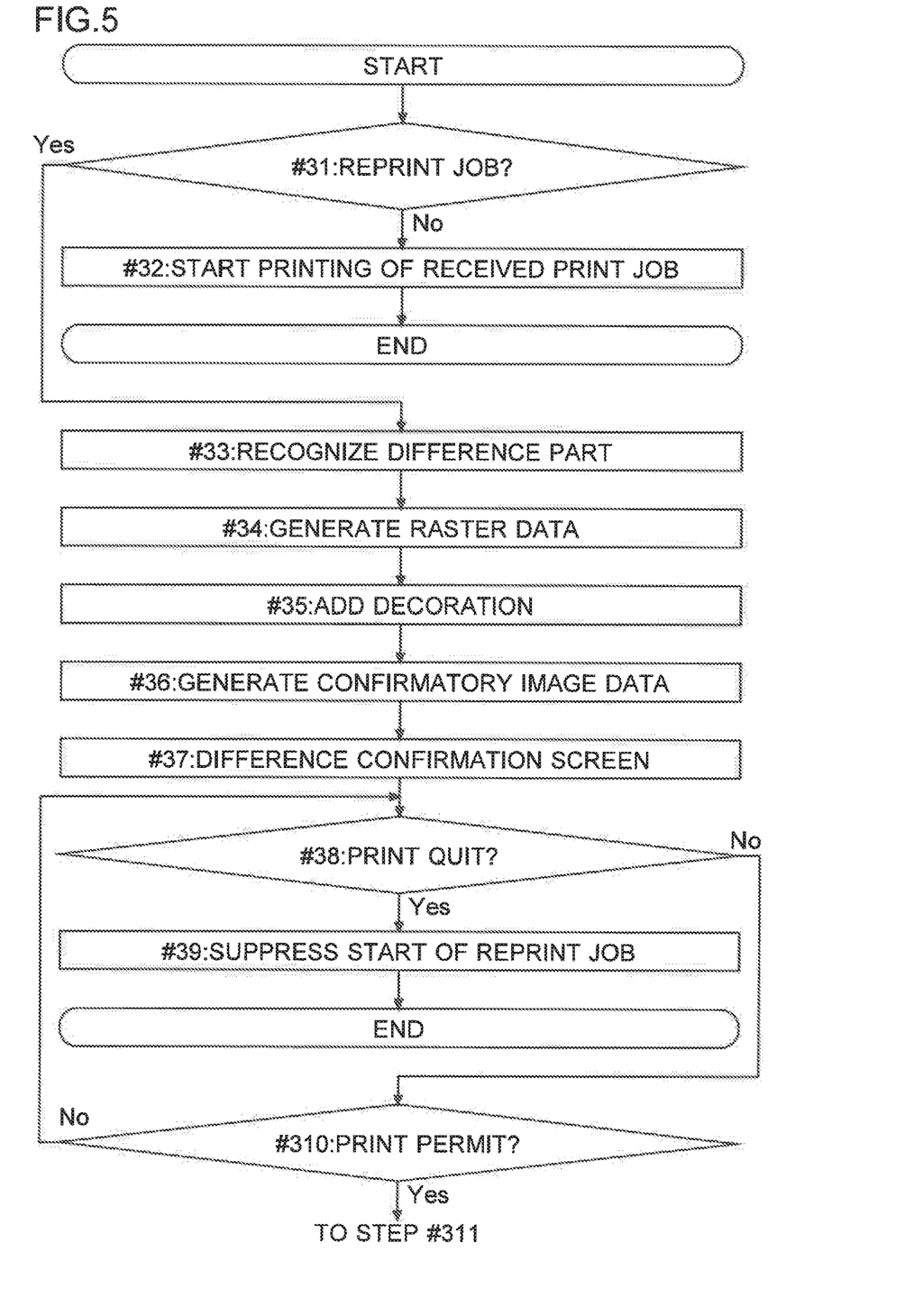
FIG. 5 is a view showing an example of a difference part display process in the multifunction peripheral according to the embodiment.

A start in FIG. 5 is a time point at which the communication circuit 6 has received print data D1 from the computer 200. The controller 1 decides whether or not the received print job is a reprint job (step #31). The controller 1 makes a decision by using the check data D2 of the storage medium 2.

By making a comparison between information contained in the print data D1 of the received print job and information contained in the check data D2, the controller 1 decides whether or not the received print job is a reprint job. For example, out of the check data D2, the controller 1 extracts pieces of the check data D2 which contain files identical in file name to files contained in the print data D1 of the received print job. For example, out of the check data D2, the controller 1 extracts pieces of check data D2 of which PDL files F1 are identical in file name to files of PDL files F1 of the received print job. When a piece of the check data D2 has been extracted, the controller 1 may decide that the received print job is a reprint job. When no piece of the check data D2 has been extracted, the controller 1 may decide that the received print job is not a reprint job.

Also, when there is a misdescription (writing error), the user corrects misdescription part of the file. Based on the corrected file, the user executes reprinting. Part other than the corrected part remains unchanged. Therefore, the controller 1 may make a comparison between characters (printed character strings) contained in the check data D2 and characters (characters to be printed) contained in the print data D1 of the received print job. For example, the controller 1 recognizes words contained in character strings and sentences which are to be printed based on the print data D1 of the received print job. The controller 1 also recognizes words contained in character strings and sentences which have been printed based on the check data D2. The controller 1 extracts pieces of the check data D2 having a matching rate of recognized words larger than a predetermined threshold value. When a piece of the check data D2 having a matching rate larger than the threshold value has been extracted, the controller 1 may decide that the received print job is a reprint job. Meanwhile, when no piece of the check data D2 having a matching rate larger than the threshold value has been extracted, the controller 1 may decide that the received print job is not a reprint job.

When deciding that the received print job is not a reprint job (No at step #31), the controller 1 starts the received print job based on the received print data D1 (step #32). The controller 1 terminates the processing concerning this flowchart (end).

When deciding that the received print job is a reprint job (Yes at step #31), the controller 1 recognizes difference part 8 between print contents of the reprint job (received print job) and print contents of the extracted check data D2 (step #33). For example, the controller 1 makes a comparison between print data D1 of the reprint job and the extracted check data D2. Out of the print data D1 of the reprint job, the controller 1 recognizes characters and images different from those of the print contents of the extracted check data D2.

In addition, when a plurality of pieces of the extracted check data D2 are involved, the controller 1 selects the latest (shortest in elapsed time since storage into the storage medium 2) one piece of the check data D2. With respect to the selected check data D2, the controller 1 executes the processing of this flowchart.

Next, based on the print data D1 of the reprint job (received print job), the controller 1 generates image data (step #34). As in the flowchart of FIG. 3, the controller 1 (image processing circuit 11) analyzes the PDL file F1 contained in the print data D1 to generate the image data.

Subsequently, the controller 1 (image processing circuit 11) decorates part of the generated image data corresponding to the recognized difference part 8 (step #35). Adding the decoration makes it possible to emphasize corrected part (difference part 8) after its subsequent printing. In addition, for printing of a reprint job, the controller does not use decorated image data. The controller may copy undecorated image data and add decoration to one of the two units of image data.

For example, the controller 1 may add shading of a predetermined decorative color to characters different from those of the extracted check data D2. Also, the controller 1 may assign a decorative color as a background color of (may add highlights of a decorative color to) characters different from those of the extracted check data D2. The controller 1 also may enclose images different from those of the extracted check data D2 with frames of a decorative color. The decorative color is determined beforehand (e.g., red color). The operation panel 4 may accept a setting for the decorative color. In this case, the controller 1 adds, as decoration, a plurality of pixels of a set color to generated image data.

Next, based on the decorated image data, the controller 1 generates confirmatory image display data (preview image data) (step #36). For example, the controller 1 reduces the pixel count (resolution) so as to enable the display on the display panel 41. In other words, the controller 1 scales down the decorated image data. In addition, in a case where the reprint job (received print job) to be executed is a job of printing plural pages, the controller 1 generates confirmatory image display data of each single page.

Figure 7:
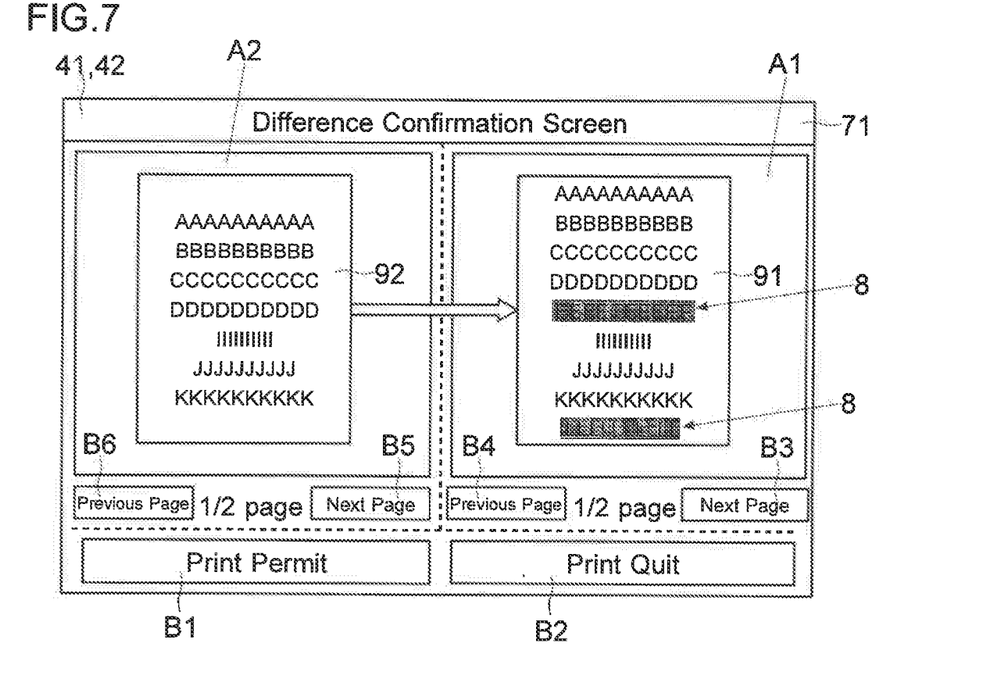
FIG. 7 is a view showing an example of a difference confirmation screen according to the embodiment.

Based on the generated confirmatory image display data, the controller 1 instructs the display panel 41 to display a difference confirmation screen 71 (step #37). FIG. 7 shows an example of the difference confirmation screen 71. In the difference confirmation screen 71, the controller 1 issues an instruction for displaying print contents (confirmatory image 91, preview image of each page) of the reprint job that is going to be printed. The difference part 8 has decoration added thereto. Therefore, the user is allowed to check whether a correction is proper or not.

As shown in FIG. 7, the controller 1 makes a print permit button B1 and a print quit button B2 displayed on the difference confirmation screen 71. An area other than the print permit button B1 and the print quit button B2 is divided into two. In a right-side first area A1, the controller 1 instructs the display panel 41 to display a first next-page button B3, a first previous-page button B4, and a confirmatory image 91. The confirmatory image 91 is an image representing print contents of the reprint job that is going to be printed. Based on the generated confirmatory image display data, the controller 1 instructs the display panel 41 to display the confirmatory image 91. FIG. 7 shows an example of a confirmatory image 91 in which a shading decoration is added to the difference part 8.

The reprint job (received print job) to be executed may include a plurality of pages. In this case, when the first next-page button B3 is operated, the controller 1 instructs the display panel 41 to display a next-page confirmatory image 91. Meanwhile, when the first previous-page button B4 is operated, the controller 1 instructs the display panel 41 to display a previous-page confirmatory image 91.

In addition, as shown in FIG. 7, in a left-side area (second area A2) of the difference confirmation screen 71, the controller 1 may instruct the display panel 41 to display a second next-page button B5, a second previous-page button B6, and a printed content image 92. The printed content image 92 shows print contents of a completed print job.

For display of the printed content image 92, the controller 1 generates display image data of the printed content image 92 based on extracted check data D2. For example, the controller 1 generates image data of each single page based on the extracted check data D2. The controller 1 scales down the generated image data to generate display image data of the printed content image 92. In a case where the print job based on the check data D2 is a job of printing a plurality of pages, the controller 1 generates display image data of a printed content image for each single page.

In the case where the print job based on the check data D2 is a job of plural pages, when the second next-page button B5 is operated, the controller 1 instructs the display panel 41 to display a next-page printed content image 92. When the second previous-page button B6 is operated, the controller 1 instructs the display panel 41 to display a previous-page printed content image 92.

Figure 6:
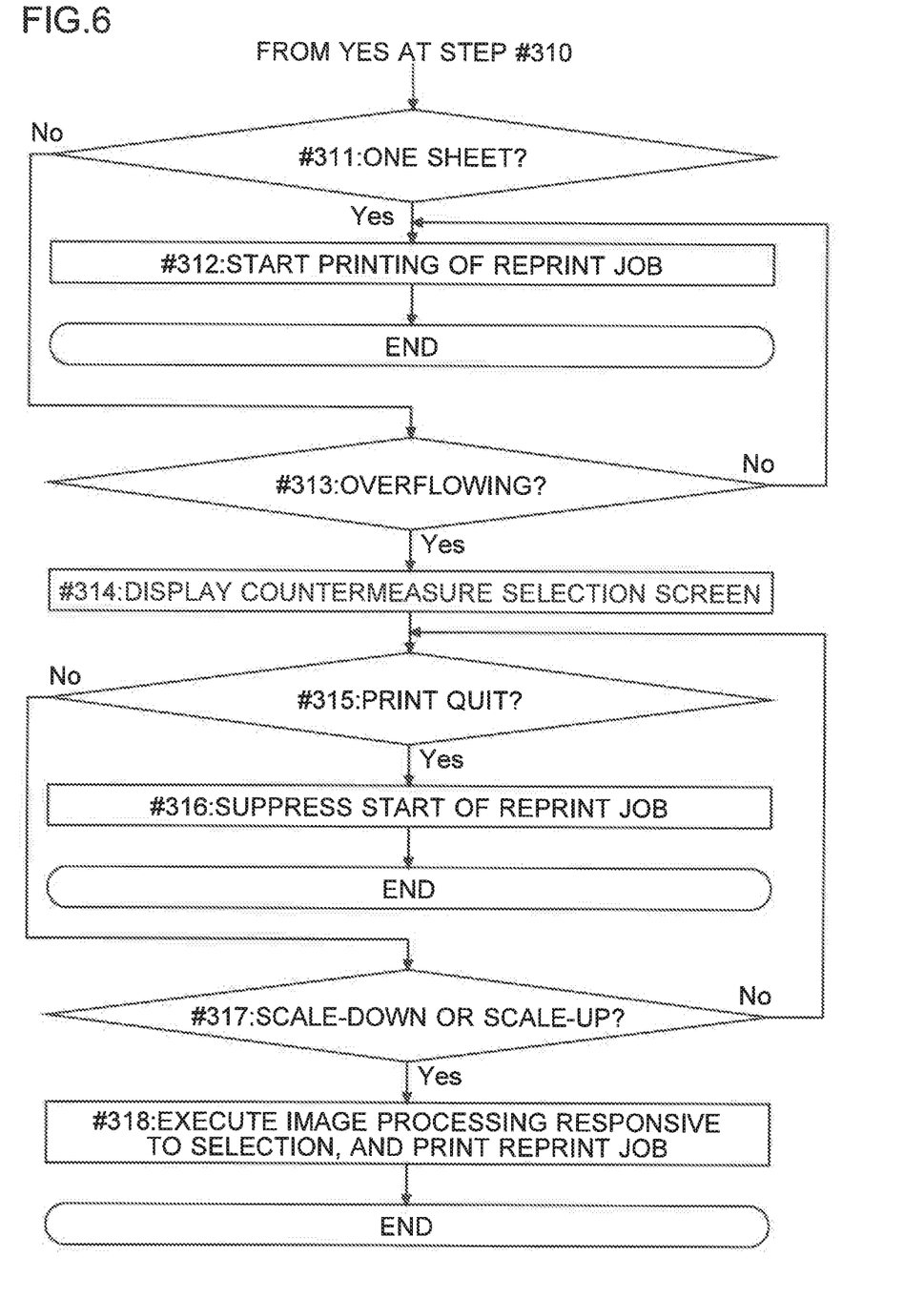
FIG. 6 is a view showing an example of a difference part display process in the multifunction peripheral according to the embodiment.

Based on an output of the touch panel 42, the controller 1 checks whether or not the print quit button B2 has been operated (step #38). When the print quit button B2 has been operated (Yes at step #38), the controller 1 does not start the reprint job (step #39). In more detail, the controller 1 erases the print data D1 of the reprint job as a process for quitting. Then, the controller 1 terminates the process concerning this flowchart (end).

When the print quit button B2 has not been operated (No at step #38), the controller 1 checks whether or not the print permit button B1 has been operated (step #310). When the print permit button B1 has not been operated (No at step #310), the controller 1 executes step #38 (returns to step #38). The controller 1 continues checking as to a print permit or a print quit.

When the print permit button B1 has been operated (Yes at step #310), the controller 1 checks whether or not the reprint job is printing of only one sheet (one page) (step #311). When it is the printing of only one sheet (Yes at step #311), the controller 1 starts printing of the reprint job based on the received print data D1 (step #312). Then, the controller 1 terminates the process concerning this flowchart (end).

When the reprint job is not printing of only one sheet (No at step #311), the controller 1 checks whether or not print part in the last page of the reprint job is fully contained within a particular range (step #313). In other words, the controller 1 checks whether or not there is an overflow out of the last page of the reprint job (received print job). Based on the print data D1 of the reprint job, the controller 1 generates image data of the last page. Based on the image data of the last page, the controller 1 recognizes positions of dots at which the color material (toner) is to be superimposed. Based on the recognized dot positions, the controller 1 checks whether or not the print part is fully contained within the particular range.

By step #313, it can be checked whether or not the last page has only one to several lines to be printed. That is, the controller 1 checks whether or not the last page includes a large non-information region (blank). The controller 1 also checks whether or not packing enables reduction of the printed sheet count (pages).

The particular range is determined beforehand. For example, the particular range is band shaped. For example, the particular range is defined as a range including an entire upper-end line of each page and having a specified length of an up/down width. The specified length may be a length within a range from several millimeters to several centimeters. The storage medium 2 stores, in nonvolatile fashion, data defining the particular range (particular-range definition data D4). For example, the storage medium 2 stores data indicative of the specified length as the particular-range definition data D4.

When the print part is fully contained within the particular range (No at step #313), the controller 1 starts printing of the reprint job based on the received print data D1 (returns to step #312). When the print part in the last page of the reprint job is fully contained within the particular range, the controller 1 keeps the operation panel 4 from displaying a countermeasure selection screen 72. On the other hand, when the print part is not fully contained within the particular range (Yes at step #313), the controller 1 instructs the display panel 41 to display the countermeasure selection screen 72 (step #314).

Figure 8:
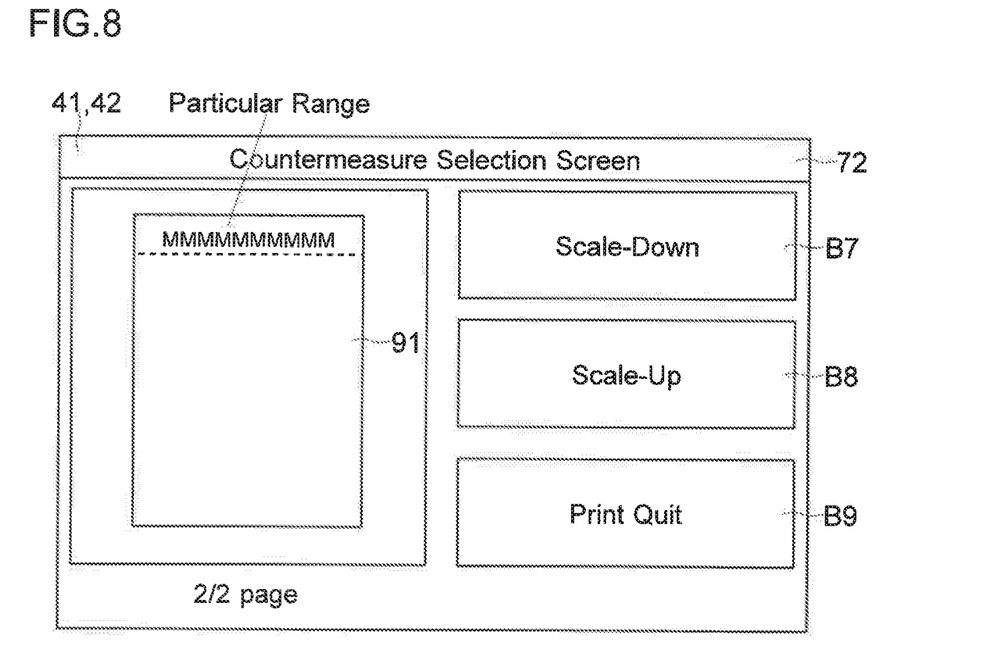
FIG. 8 is a view showing an example of a countermeasure selection screen according to the embodiment.

FIG. 8 is a view showing an example of the countermeasure selection screen 72. In the countermeasure selection screen 72, the controller 1 issues an instruction for displaying a confirmatory image 91 (print contents, preview image) of the last page of the reprint job that is going to be printed. The controller 1 uses confirmatory image display data (preview image data) of the last page.

Further, the controller 1 makes a scale-down button B7, a scale-up button B8, and a print quit button B9 displayed on the countermeasure selection screen 72. With a desire of reducing the page count by one page, the user operates the scale-down button B7. When the operation panel 4 accepts the operation of the scale-down button B7, the controller 1 recognizes that a scale-down has been selected. With a desire of increasing the print contents of the last page, the user operates the scale-up button B8. When the operation panel 4 accepts the operation of the scale-up button B8, the controller 1 recognizes that a scale-up has been selected. With a desire of quitting a print, the user operates the print quit button B9. When the operation panel 4 accepts the operation of the print quit button B9, the controller 1 recognizes that a print quit has been selected.

Based on an output of the touch panel 42, the controller 1 checks whether or not a print quit has been selected (step #315). In other words, the controller 1 checks whether or not the print quit button B9 has been operated. When a print quit has been selected (Yes at step #315), the controller 1 does not start the reprint job (step #316). In more detail, as a process for quitting, the controller 1 erases the print data D1 of the reprint job. Then, the controller 1 terminates the processing concerning this flowchart (end).

When a print quit has not been selected (No at step #315), the controller 1 checks whether or not a scale-down or a scale-up has been selected (step #317). When neither a scale-down nor a scale-up has been selected (when neither the scale-down button B7 nor the scale-up button B8 has been operated; No at step #317), the controller 1 executes step #315 (returns to step #315). The controller 1 awaits a selection by the user.

When a scale-down or a scale-up is selected (Yes at step #317), the controller 1 executes image processing corresponding to the selection, instructing the printing unit 5 to execute a printing of the reprint job (step #318). Then, the controller 1 terminates the processing concerning this flowchart (end).

When a scale-down is selected, the controller 1 executes processing for reducing the page count of the reprint job. Then, the controller 1 instructs the printing unit 5 to execute printing based on image data that has been processed for reduction of the page count. For example, the controller 1 executes processing for reduction by one page.

When a scale-down is selected, the controller 1 scales down image data of the last page plus a one-page preceding page from the last page, out of image data generated by rasterizing. Next, the controller 1 copies a region corresponding to the particular range in the scaled-down last page. Then, the controller 1 erases the image data of the last page. The controller 1 pastes data of the copied region in addition to the image data of the one-page preceding page from the last page. For example, the controller 1 pastes the data of the copied region in lower-end part of the image data of the one-page preceding page from the last page. The controller 1 determines a scale-down factor in such fashion that an up/down-directional width of the image data of the one-page preceding page from the last page is scaled down to an extent equal to an up/down-directional width of the copied particular range.

Further, in the rasterizing process of the one-page preceding page from the last page, the controller 1 may execute a process of scaling down (narrowing) line spacing. In this case, the controller 1 copies a region corresponding to the particular range in the image data of the last page. The controller 1 pastes the data of the copied region in a space generated by narrowing the line spacing out of the image data of the one-page preceding page from the last page. The controller 1 narrows the line spacing in such fashion that an up/down-directional width of the image data of the one-page preceding page from the last page is scaled down to an extent equal to an up/down-directional width of the copied particular range.

When a scale-up is selected, the controller 1 scales up image data of the last page plus a one-page preceding page from the last page, out of the image data generated by rasterizing. Next, the controller 1 copies a region overflowing from the original size by the scale-up, out of the image data of an after-scale-up one-page preceding page from the last page. Then, the controller 1 translates downward image data of the particular range in the last page. The controller 1 may paste the copied region (data) in a space generated by the translation.

Also, in the rasterizing process of the one-page preceding page from the last page, the controller 1 may execute a process of scaling up line spacing. Next, the controller 1 copies a region overflowing in the up/down direction by widening the line spacing. Then, the controller 1 translates downward image data of the particular range in the last page. The controller 1 may paste the copied region (data) in a space generated by the translation.

As described above, the image forming apparatus (multifunction peripheral 100) according to the embodiment includes an operation panel 4, a communication circuit 6, a printing unit 5, a storage medium 2, and a controller 1. The operation panel 4 executes display and accepts operations. The communication circuit 6 receives print data D1. The printing unit 5 executes a received print job which is a print job based on the received print data D1. The storage medium 2 stores check data D2 which is the print data D1 of the received print job that has been completed. The controller 1, upon reception of the print data D1 by the communication circuit 6, decides, by using the check data D2 of the storage medium 2, whether or not the received print job which is going to be executed based on the received print data D1 is a reprint job for redoing printing. Then, upon deciding as the reprint job, the controller 1 recognizes difference part 8 between print contents that have been printed and print contents of the reprint job. The controller 1 further instructs the operation panel 4 to display the difference part 8.

It is possible to show a user differences between a previously printed document (already printed contents) and a soon-to-be-printed document (contents to be printed). The user is enabled to check differences between a printed matter having contained errors and a printed matter to be obtained soon (corrected printed matter). The user is enabled to check whether or not errors are properly corrected. Before a print start, the user is enabled to check whether or not contents of the reprint job are correct. Allowing the user to check whether or not errors have been corrected makes it possible to prevent repetitions of correction and reprinting.

With the difference part 8 displayed on the operation panel 4, after the operation panel 4 accepts a print permit for the reprint job, the controller 1 instructs the printing unit 5 to start printing of the reprint job. After the checking of differences, the reprint job may be started only when there are no problems. Redoing of printing (reprint) based on one identical file needs to be done only once. Waste of paper sheets, color materials, time and electric power can be suppressed to a minimum.

Subsequent to displaying of the difference part 8, the controller 1 instructs the operation panel 4 to display a countermeasure selection screen 72 for selection of a countermeasure. In response to a selection of a scale-down on the countermeasure selection screen 72, the controller 1 executes a process for reducing a page count of the reprint job, and instructs the printing unit 5 to execute printing based on image data that has been processed for reduction of the page count. Even when there remain any errors after the checking of the difference part 8, a countermeasure for resolving the errors can be selected. Even when adjustment for such layout as to minimize the page count is not completely fulfilled, the page count of the reprint job can be reduced. It becomes possible to avoid printing only a little quantity in the last page. Also, it is no longer necessary to correct a file by the computer 200 and retransmit the print data D1. It is also unnecessary to repeatedly come and go between the computer 200 and the image forming apparatus.

In response to a selection of a scale-up on the countermeasure selection screen 72, the controller 1 executes a process for reducing blank part in a last page of the reprint job, and instructs the printing unit 5 to execute printing based on image data that has been processed for reduction of the blank part. Selecting a scale-up makes it possible to reduce blank regions (regions where nothing is printed) in the last page of the reprint job.

In response to a selection of a print quit on the countermeasure selection screen 72, the controller 1, without starting the reprint job, erases the print data D1 of the reprint job. When it is desired to correct a file by the computer 200 for reduction of pages, printing may be quitted. Wasteful printing can be avoided.

The controller 1 instructs the operation panel 4 to display the countermeasure selection screen 72 when print part in a last page of the reprint job is fully contained within a predetermined particular range. The controller 1 keeps the operation panel 4 from displaying the countermeasure selection screen 72 when print part in the last page of the reprint job is not fully contained within the particular range. The countermeasure selection screen 72 may be displayed only when a small quantity of information (characters, graphics) is to be printed in the last page of the reprint job.

Out of the check data D2 stored in the storage medium 2, the controller 1 erases each piece of the check data D2 whose elapsed time since its storage is more than a predetermined hold time D3. Pieces of the check data D2 of the print job that have undergone a lapse of time since completion of the printing can be automatically erased. Lacks of storage capacity of the storage medium 2 can be avoided.

The embodiment of the present disclosure has been fully described hereinabove. The scope of the disclosure is not limited to the above description, and the embodiment may be carried out with various changes and modifications applied thereto unless those changes and modifications depart from the gist of the disclosure.

What is claimed is:

1. An image forming apparatus comprising:
an operation panel which executes display and accepts operations;
a communication circuit which receives print data;
a printing unit which includes an image former and executes a received print job which is a print job based on the received print data;
a storage medium which stores check data which is the print data of the received print job that has been completed; and
a controller which, upon reception of the print data by the communication circuit, decides, by using the check data of the storage medium, whether or not the received print job which is going to be executed based on the received print data is a reprint job for redoing printing,
then, upon deciding as the reprint job, recognizes difference part between print contents that have been printed and print contents of the reprint job, and
further instructs the operation panel to display the difference part,
the controller,
after the difference part is displayed, instructing the operation panel to display a countermeasure selection screen for selection of a countermeasure, and
in response to a selection of a scale-down on the countermeasure selection screen, executing a process of reducing a page count of the reprint job, and instructs the printing unit to execute printing based on image data that has been processed for reduction of the page count.

2. The image forming apparatus according to claim 1, wherein
with the difference part displayed on the operation panel, after the operation panel accepts a print permit for the reprint job, the controller instructs the printing unit to start printing of the reprint job.

3. The image forming apparatus according to claim 1, wherein
in response to a selection of a scale-up on the countermeasure selection screen,
the controller executes a process of reducing blank part in a last page of the reprint job, and instructs the printing unit to execute printing based on image data that has been processed for reduction of the blank part.

4. The image forming apparatus according to claim 1, wherein
in response to a selection of a print quit on the countermeasure selection screen,
the controller, without starting the reprint job, erases the print data of the reprint job.

5. The image forming apparatus according to claim 3, wherein
in response to a selection of a print quit on the countermeasure selection screen,
the controller, without starting the reprint job, erases the print data of the reprint job.

6. The image forming apparatus according to claim 1, wherein
the controller
instructs the operation panel to display the countermeasure selection screen when print part in a last page of the reprint job is fully contained within a predetermined particular range, and
keeps the operation panel from displaying the countermeasure selection screen when print part in a last page of the reprint job is not fully contained within the particular range.

7. The image forming apparatus according to claim 6, wherein
the particular range is a band-shaped range including an entire upper-end line of a page and having a specified length of an up/down width.

8. The image forming apparatus according to claim 1, wherein
the controller
extracts the check data containing files identical in file name to files contained in the print data of the received print job, and
with the extraction successfully done, decides that the received print job is the reprint job.

9. An image forming apparatus comprising:
an operation panel which executes display and accepts operations;
a communication circuit which receives print data;
a printing unit which includes an image former and executes a received print job which is a print job based on the received print data;
a storage medium which stores check data which is the print data of the received print job that has been completed; and
a controller which, upon reception of the print data by the communication circuit, decides, by using the check data of the storage medium, whether or not the received print job which is going to be executed based on the received print data is a reprint job for redoing printing,
then, upon deciding as the reprint job, recognizes difference part between print contents that have been printed and print contents of the reprint job, and
further instructs the operation panel to display the difference part,
the controller
recognizing words to be printed based on the print data of the received print job,
recognizing words having been printed based on the check data, and deciding that the received print job is the reprint job when extraction of the check data with a matching rate of recognized words larger than a predetermined threshold value has been successfully done.

10. The image forming apparatus according to claim 1, wherein
out of the check data stored in the storage medium, the controller erases each piece of the check data having an elapsed time more than a predetermined hold time since its storage.

11. An image forming apparatus control method comprising the steps of:
receiving print data;
executing a received print job which is a print job based on the received print data;
storing check data which is the print data of the received print job that has been completed;
upon receiving the print data, deciding, by using the check data, whether or not the received print job which is going to be executed based on the received print data is a reprint job for redoing printing;
upon deciding as the reprint job, recognizing difference part between print contents that are before redoing and have been printed and print contents of the reprint job;
displaying the difference part;
after displaying of the difference part, displaying a countermeasure selection screen for selection of a countermeasure:
in response to a selection of a scale-down on the countermeasure selection screen, executing a process of reducing a page count of the reprint job; and
executing printing based on image data that has been processed for reduction of the page count.

12. The image forming apparatus according to claim 9, wherein
with the difference part displayed on the operation panel, after the operation panel accepts a print permit for the reprint job, the controller instructs the printing unit to start printing of the reprint job.

13. The image forming apparatus according to claim 9, wherein
the controller
extracts the check data containing files identical in file name to files contained in the print data of the received print job, and
with the extraction successfully done, decides that the received print job is the reprint job.

14. The image forming apparatus according to claim 9, wherein
out of the check data stored in the storage medium, the controller erases each piece of the check data having an elapsed time more than a predetermined hold time since its storage.

* * * * *